United States Patent
Higley

Patent Number: 5,449,574
Date of Patent: Sep. 12, 1995

[54] ELECTRICAL DEVICE HAVING ALTERNATING LAYERS OF FIBROUS ELECTRODES

[75] Inventor: Lin R. Higley, Troy, Mich.

[73] Assignee: Hughes Aircraft Company, Los Angeles, Calif.

[21] Appl. No.: 350,346

[22] Filed: Dec. 6, 1994

[51] Int. Cl.$^6$ .................. H01M 6/00; H01M 4/00
[52] U.S. Cl. .................. 429/152; 429/209; 429/140; 29/623.1; 29/623.5
[58] Field of Search .......... 29/623.1, 623.5; 429/235, 152, 160, 161, 140, 209; 361/271, 503, 523

[56] References Cited

U.S. PATENT DOCUMENTS

| | | | |
|---|---|---|---|
| 4,310,607 | 1/1982 | Shoy | 29/623.1 |
| 4,788,114 | 11/1988 | Rothman | 429/140 X |
| 4,788,114 | 11/1988 | Rothman | |
| 5,034,290 | 7/1991 | Sands et al. | 429/160 X |

OTHER PUBLICATIONS

Tim Stevens, "Electrically Conductive Polymers," *Mechanical Engineering*, pp. 21–24 (Feb. 1991).
Anon., "Lightweight, High-Energy Lead/Acid Battery," *NASA Tech Briefs*, pp. 21–22 (Apr. 1991).
Anon., "Dr. Gereth . . . Varta's 'no miracles' man," *Batteries International*, pp. 20, 21, and 24 (Jan. 1993).

*Primary Examiner*—Anthony Skapars
*Attorney, Agent, or Firm*—Terje Gundmestad; W. K. Denson-Low

[57] ABSTRACT

An electrical device such as a battery (20) or capacitor is formed as alternating facing layers of an array of fibrous electrodes. The fibrous electrodes (24) of one set of layers are connected at one end (36) of the array, and the fibrous electrodes (30) of the alternating set of layers are connected at the other end (38) of the array. The fibrous electrodes (24, 30) of the two layers, taken together, preferably have a two-dimensional close-packed arrangement. Desirably, no connection is made to at least one of each pair of any shorted electrodes that may be present.

20 Claims, 4 Drawing Sheets

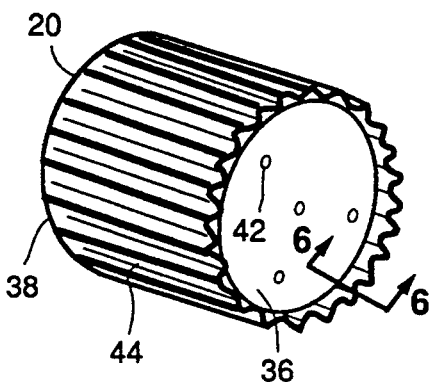
FIG. 1.
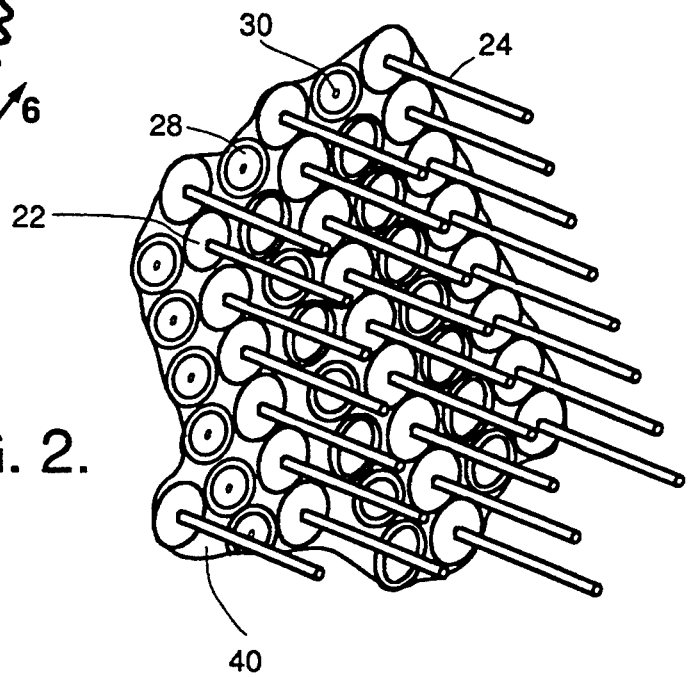
FIG. 2.
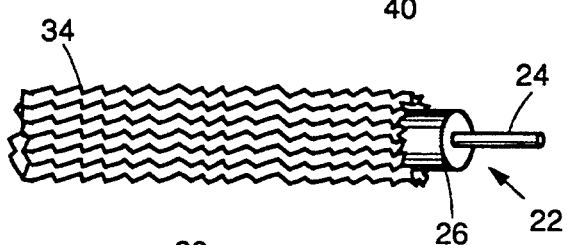
FIG. 3.
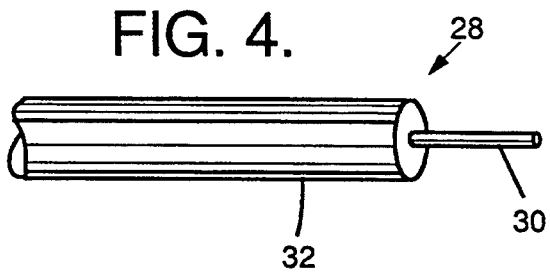
FIG. 4.
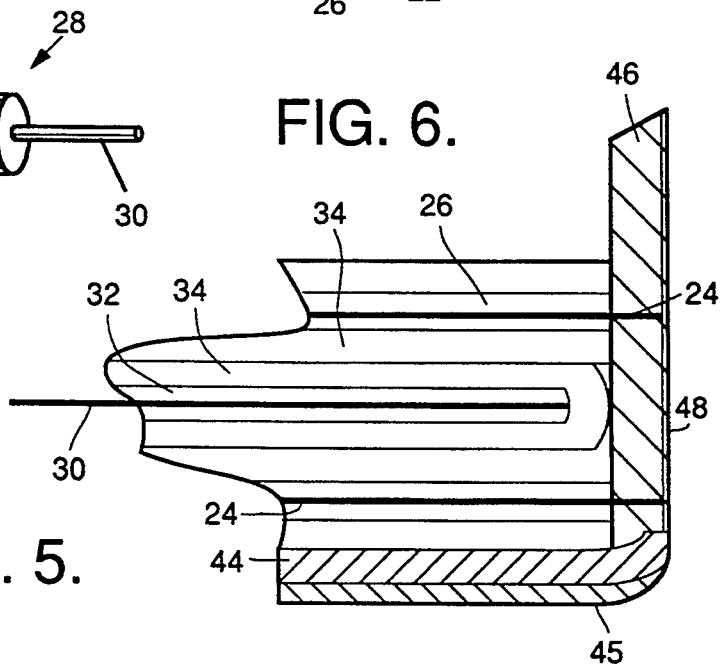
FIG. 5.
FIG. 6.

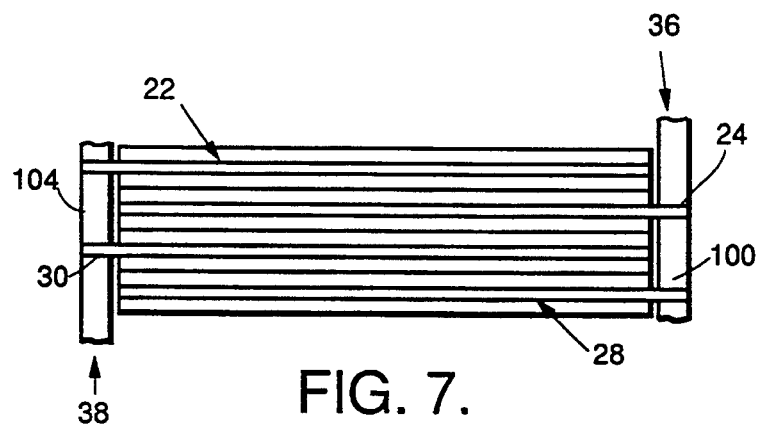
FIG. 7.
FIG. 10.
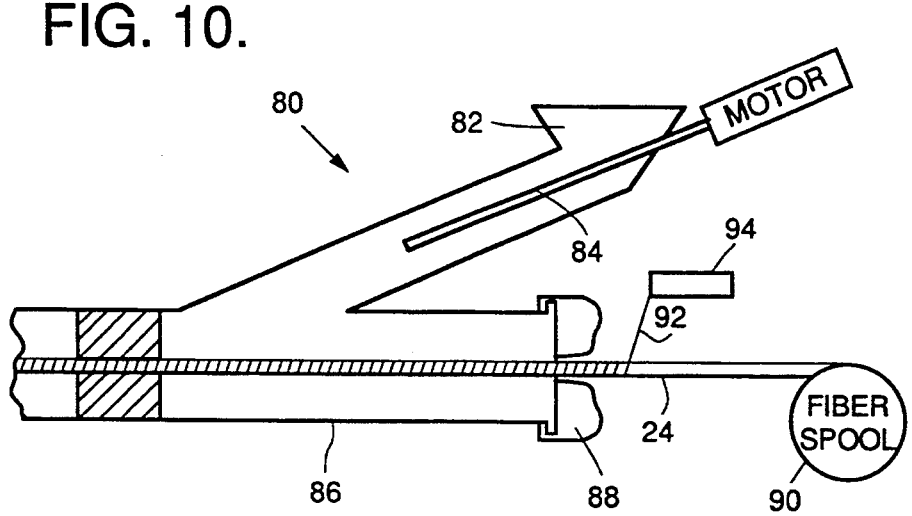
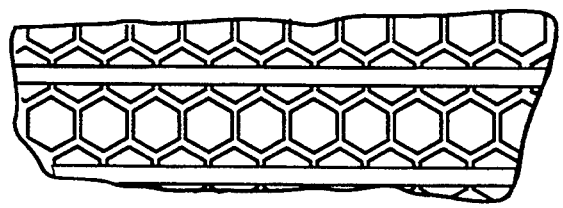
FIG. 11.
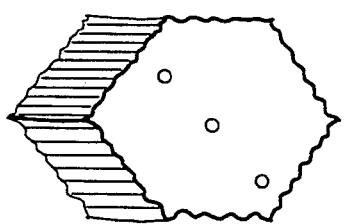
FIG. 12.

ELECTICAL DEVICE HAVING ALTERNATING LAYERS OF FIBROUS ELECTRODES

This invention was made with Government support under Contract No. DAAA21-85-C-0156 awarded by Department of the Army. The Government has certain rights in this invention.

BACKGROUND OF THE INVENTION

This invention relates to electrical devices such as storage cells, capacitors, and pseudo-capacitors that store electrical energy, and, more particularly, to such devices formed of arrays of fibrous electrodes.

One of the approaches to the storage of electrical energy is a bipolar device in which a voltage is applied across opposing electrodes having an intermediate layer. Electrical charge accumulates on the surfaces of the electrodes. In a temporary storage device such as a capacitor, the charge flows from the electrodes as an electrical current when the applied voltage is removed. In a longer-term storage device such as an electrochemical storage cell, the applied charge causes electrochemical changes in the intermediate layer that converts the electrical energy to chemical energy. The chemical energy can be later released upon the discharge of the electrochemical cell.

The performance of such bipolar electrical storage devices depends in part upon the available surface area of the electrodes. The simplest electrical storage devices use one or more pairs of opposing flat electrodes arranged in a facing relationship. More surface area and thence greater storage capacity and performance can be achieved by making the electrodes in other forms.

Storage devices using rodlike electrodes have been known in the art, see for example, U.S. Pat. No. 4,788,114. In such devices, the rod-shaped electrodes of both types are bundled and connected at opposing ends to an end plate structure. In the case of a storage cell, an electrolyte is introduced between the electrodes. Such storage devices with rodlike electrodes have improved storage capacity as compared with flat-plate bipolar devices.

Although they are operable, the existing electrical storage devices using rodlike electrode arrangements have drawbacks. One is that the internal impedance may be excessively high. Another is that internal electrical short circuits may be present or may develop between electrodes of opposite polarity. This problem becomes more significant as the diameter of the electrodes is made smaller. The use of ever-smaller electrodes is a desirable goal because the available surface area per unit volume of the storage cell increases with decreasing electrode cylindrical diameter. Thus, in recent generations of electrical storage devices using rodlike electrodes the problem of internal electrical shorts has become of more concern. Finally, there is the ongoing desire to develop greater storage capacities in such devices, with lower manufacturing costs.

There is thus an ongoing need for improved electrical storage devices using rodlike electrodes, particularly where the electrode diameters are made quite small. The present invention fulfills this need, and further provides related advantages.

SUMMARY OF THE INVENTION

The present invention provides a construction for an electrical storage device, and a method for its manufacture, that imparts a reduced internal impedance to the device. The manufacturing approach utilizes manufacturing techniques known in the structural composites and microelectronics manufacturing fields, and thus does not require the development of new manufacturing technologies. These techniques also permit the electrical device to be manufactured inexpensively in large-scale production. The method of manufacture minimizes the incidence of internal electrical shorts. Where electrical shorts are present, however, any adverse effect of their presence is avoided.

In accordance with the invention, a method for preparing an electrical device comprises the steps of furnishing first fibrous electrodes and second fibrous electrodes, which may be of the same or different construction. A group of the first fibrous electrodes is arranged into a first layer with the first fibrous electrodes parallel to each other in the first layer. A group of the second fibrous electrodes is arranged into a second layer with the second fibrous electrodes parallel to each other in the second layer. The first layer and the second layer are placed together to form an array of electrodes. The second layer is immediately adjacent to and in facing relationship with the first layer, and the fibrous electrodes of the two layers are parallel to each other. First electrical connections are formed to at least some of the first fibrous electrodes at a first end of the array, and second electrical connections are formed to at least some of the second fibrous electrodes at a second end of the array.

In the preferred approach, additional alternating layers are added, with the layers alternatively comprising either first electrodes or second electrodes. That is, all of the electrodes of each layer are of a single type, so that the structure of the device is built up as alternating layers of the two types of electrodes. The electrodes of the layers can be arranged in a close-packed form that maximizes the performance. Additionally, the alternatingly layered arrangement minimizes internal impedance of the device. This alternating layered structure can alsobe assembled in a merging of continuous strips of fiber electrodes that are rolled up or layered to form a cell stack.

The electrodes themselves are formed as a fibrous electrical conductor with an overlying layer. Composite fabrication techniques are used to prepare and process fibrous electrical conductors that are as small as on the order of from about 0.001 millimeters to about 1.5 millimeters in diameter. The available active surface area of each electrode can therefore be high, as there are many small electrodes contributing to the total available surface area. The electrodes may be cylindrical, or irregular or themselves of a composite structure to further enhance the available surface area. The nature of the conductor and the overlying layer depends upon the specific type of device. The overlying layer is a dielectric for a capacitor. The overlying layer is an electrochemically active material covered with a separator, or a solid ion conductor such as Nafion or Dowion for a storage cell or pseudo-capacitor. Other operable structures of the electrodes are possible.

When the electrodes are prepared, care is taken to ensure that the separator or insulating portion of the overlying layer is continuous in order to physically and electrically isolate each electrode from its neighbor of opposite polarity in the adjacent layer. However, in the course of manufacturing and assembling large numbers and lengths of fibrous electrodes of small diameter, it may be expected that there will be be some minor incidence of structural defects that could lead to electrical shorts between adjacent fibrous electrodes.

The preferred manufacturing technique of the invention recognizes that such structural defects may be present for a few of the fiber electrodes, and circumvents such defects to avoid electrical shorts that might otherwise occur. Electrical connection is made to each of the groups of fiber electrodes in the alternating layers at their respective oppositely disposed ends. The terminal connections are preferably made using microelectronic deposition and etching techniques for fiber electrodes of a size smaller than about 0.1 millimeters. For larger fiber electrodes, techniques used for circuit boards may be used to make the terminal connections. A voltage is applied to each of the electrodes of one of the groups, and the charge on the electrodes of the other group is monitored. Any electrodes of the second group that are internally shorted to those of the first group are apparent because they will evidence the voltage applied to the first group. In construction of the final device, electrical connection is made only to the electrodes of the second group which were not internally shorted.

The present invention provides an approach to preparing an electrical device of high internal surface area from sets of fibrous electrodes. High efficiency and good electrical characteristics of the device are attained. Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 1 is a perspective view of a portion of a battery in accordance with the invention, with part of one end removed to illustrate the interior;

FIG. 2 is an enlargement of an interior portion of FIG. 1;

FIG. 3 is an enlarged elevational view of a portion of a first electrode;

FIG. 4 is an enlarged elevational view of a portion of a second electrode;

FIG. 5 is an enlargement of a casing portion of FIG. 1;

FIG. 6 is a side sectional view of a portion of the battery of FIG. 1, taken along lines 6—6;

FIG. 7 is a side elevational view of a portion of the battery of FIG. 1, with the external casing removed;

FIGS. 9(a)–(c) are schematic illustrations of the application of the electrical connections to the device array, wherein FIG. 9(a) is a perspective view of the first end of the array with the connections in place, FIG. 9(b) is a perspective view of the second end of the array with the connections indicated relative to the two sets of fibrous electrodes, and FIG. 9(c) is a detail of FIG. 9(b);

FIG. 10 is a perspective view of an apparatus for preparing coated electrode fibers;

FIG. 11 is an end elevational view of a storage cell with hexagonally shaped electrodes; and FIG. 12 is a perspective view of a storage cell with an external hexagonal shape.

DETAILED DESCRIPTION OF THE INVENTION

Figure 8:
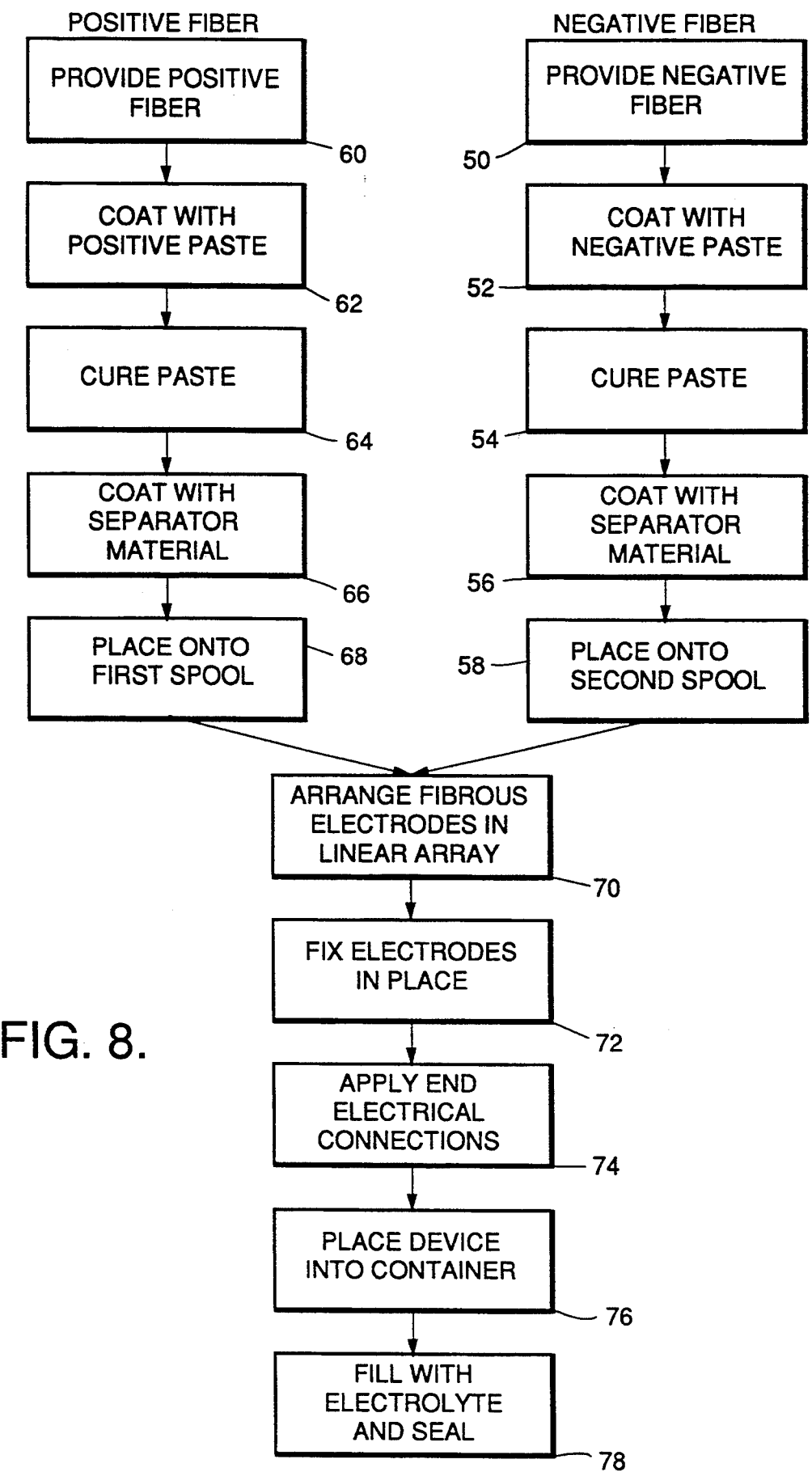
FIG. 8 is a process flow chart for the preparation of the battery of the invention.

Various types of bipolar and quasi-bipolar electrical storage devices are within the scope of the invention. FIG. 1 depicts a preferred battery 20 according to the present invention. A capacitor is similar, except that the fibrous electrodes are of a different structure. The following description of the device structure is therefore generally applicable to capacitors as well as batteries, with the understanding that capacitors utilize fibrous electrodes and other details of construction specific to capacitors.

The battery 20 is preferably a platelike battery, wherein the battery is relatively thin compared to its lateral dimension. FIG. 1 illustrates only a portion of the battery, so this relative dimensional relation cannot be easily discerned. The battery 20 may be round in its peripheral boundary or of other shapes.

The battery 20 is formed with a plurality of interspersed fiber electrodes, as shown in FIG. 2. The fiber electrodes are arranged into a layered structure, with layers of first fibrous electrodes, the fibrous anodes 22, and layers of second fibrous electrodes, the fibrous cathodes 28. That is, when viewed on end the battery 20 has planar rows of fibrous anodes 22 adjacent to, and in facing relation to, linear rows of fibrous cathodes 28. In other embodiments, the layers need not be planar. For example, the alternating layers could be rolled together in a Jelly-roll fashion. This layered structure is to be contrasted with prior fibrous electrode structures that utilized random, nearest neighbor, or irregularly bundled fibrous structures. The regular alternating layered structure results in reduced internal impedance in the finished electrical device, and also allows external connections to be made more readily.

In the preferred battery anode structure shown in FIG. 3, each fiber anode 22 includes a central electrically conductive anode fiber 24 that acts as a current collector and an anode active material layer 26 surrounding the anode fiber 24. The fiber anode 22 is generally cylindrical in external shape. The composition of the anode fiber 24 and the anode active material 26 will depend upon the exact type of battery. In a typical case, the anode fiber 24 is a metal such as lead or lead-coated titanium, and the active material 26 is conventional cured negative battery paste. The anode fiber 24 may be coated to improve its electrical performance in its collector role.

A fiber cathode 28, shown in detail in FIG. 4, includes a central electrically conductive cathode fiber 30 that acts as a current collector and a cathode active material layer 32 surrounding the cathode fiber 30. The fiber cathode 28 is generally cylindrical in external shape. The composition of the cathode fiber 30 and the cathode active material 32 will depend upon the exact type of battery. In a typical case, the cathode fiber 30 is graphite or metal and the active material 32 is conventional cured positive battery paste. The cathode fiber 30 may also be coated as desired to improve its performance.

At least one of each fiber anode 22 or each fiber cathode 28 is covered by a separator layer 34, to prevent shorting contact between the anodes 22 and the cathodes 28. In the preferred case, each of the fiber anodes 22 is covered with an insulator such as a woven glass fiber sheath whose ends are sealed with epoxy, as the separator layer 34. Other separators known in the art, such as polymeric or composite sheaths, can also be used.

When the electrical device is a capacitor, the first fibrous electrode and second fibrous electrode are made specific to a capacitor. For example, the first fibrous electrodes could be carbon/carbon in structure, and the second fibrous electrodes could be carbon/tantalum oxide in structure. In overlying layer is a porous polymer separator layer, a solid polymer ionic conductor, or a dielectric.

Returning to the discussion of the battery structure of FIG. 2, the fiber anodes 22 and fiber cathodes 28 are arranged in an alternating, interspersed fashion. In this preferred form, the electrodes 22 and 28 are arranged in alternating layers. The electrodes are also arranged so that all of the anode fibers 24 extend out of a first end 36 of the battery 20 and all of the cathode fibers 30 extend out of a second end 38 of the battery 20. The view of FIG. 2 is from the first end, so only the elongated anode fibers 24 are seen. The cathode fibers 30 are apparent only from their ends, but extend in an elongated fashion out of the second end 38 of the battery 20. This arrangement is further depicted in FIG. 7, an enlarged elevational view of a region of the battery 20, showing the end connections.

The interstices 40 between the fiber anodes 22 and the fiber cathodes 28 are filled with an electrolyte such as sulfuric acid in the case of a lead/acid battery. Sealable combination vent and fill holes 42 are provided in the ends of the battery 20 for the purpose of venting internal pressure and adding electrolyte when the battery 20 is to be used.

The battery 20 is bounded on its lateral sides by a casing 44 that is an electrical insulator, as shown in FIG. 5. The casing 44 is preferably a compliant polymeric or elastomeric material such as Epmar flexible epoxy, polyvinyl chloride, polyolefin, polypropylene, Noraprene ® plastic, or glass-fiber composite, but may also be a ceramic, a glass, or other insulator. In one approach, the preferred elastomer is castable. That is, it is provided in a liquid form that can be poured into a mold surrounding the array of electrodes 22 and 28, and then cured into a hardened, but compliant, solid form. The casing 44 is preferably about 0.050 inches thick in the hardened form. Optionally, a thin metallic housing 45 may be provided over the casing 44 to prevent punctures and to improve the handling and mounting characteristics of the battery. One preferred approach is to corrugate the housing 45 to permit it to expand and contract during service.

FIG. 6 illustrates the terminal connections, in this case at the first end 36 to the anode fibers 24. (The terminal connections to the cathode fibers are at the other end, and are similar in the respects to be discussed here. Further details of the connections are discussed subsequently.) An electrically insulating end plate 46 is applied at the first end 36 over the anode fibers 24 that extend from the first end 36. The compliant end plate 46 is preferably made of a castable compliant material such as that discussed above in relation to the casing 44, and is sealed thereto. The compliant end plate 46 is preferably cast in place and cured, either at the same time the compliant casing 44 is cast and cured, or at a later time if that is more convenient in the manufacturing operation.

A metallic connector 48 is applied over the compliant end plate 46. Before the connector 48 is applied, the ends of the electrode fibers, here the anode fibers 24, are cut off to a uniform length. The anode fibers 24 may be flush with the surface of the end plate 46, or, preferably, extend out of the end plate 46 by some small amount. The connector 48 is preferably a conductive metal such as aluminum or silver (or one of their alloys) applied by standard microelectronic deposition and patterning procedures. These will be discussed more fully in relation to FIG. 9.

FIG. 8 is a flow chart summarizing the fabrication procedure that is used to prepare an operable battery 20. The process is generally applicable, but in the following discussion the specific procedure for preparing a working embodiment of the invention will be described. This battery is a lead/acid battery.

The negative fiber anodes 22 are prepared, numeral 50. The anode fiber 24 is made of a material such as lead, lead-coated S-glass, carbon, or copper, which optionally may be wrapped with carbon fiber. When the carbon wrapping is used, the anode fiber 24 may be pre-coated with a thin layer of another material, such as tin oxide ($SnO_2$) or barium antimonide (BaSb), in the case of the metal fiber. The anode fiber 24 is preferably from about 0.008 to about 0.012 inches in diameter, but may be larger. Preferably, the diameter is not larger than about 0.080 inches.

To apply the active material 26 as a paste, numeral 52, an apparatus such as that of FIG. 10 is used. A flowable paste of standard negative active material paste mix is prepared according to well known procedures, using carbon particles mixed with oxides, barium sulfate, sulfuric acid, and water. This flowable paste mix is loaded into an applicator 80 having a reservoir 82 with a plunger or pump augur 84 by which pressure can be applied to the paste mix. The applicator 80 further has an applicator tube 86 through which the anode fiber 24 is threaded. The inside diameter of the applicator tube 86 is preferably slightly larger than the desired diameter of the fiber anode 22 when complete. A rubber septum 88 at one end permits the anode fiber 24 to be passed into the applicator tube 86.

In the illustrated embodiment, the anode fiber 24 is delivered from a spool 90. Before it is wound onto the spool, the anode fiber 24 is first coated with an adhesive such as a graphite cement. Gaps corresponding to the ends of the fibers when cut to a desired length may be provided. The graphite cement is cured under tension and twist in air overnight, then heated to 150° C. for two hours and 500° C. for ½ hour in a reducing gas to complete curing of the graphite cement. The anode fiber 24 is wrapped with carbon fiber 92 by a spiral wrapping head 94 as it moves from the spool 90 to the applicator tube 86. The fiber anode 22 and wrapped carbon fiber 92 pass through the septum 88 into the interior of the applicator tube 86.

The negative paste is applied continuously, numeral 52, by turning the augur 84 as the anode fiber 24 is drawn through the applicator tube 86. Paste mixture is extruded out of the open end of the applicator tube 86 adhering to the surface of the anode fiber 24. The paste is hardened and cured, numeral 54, by heating the paste-coated fiber to 60°–90° C. for 12 hours in air of 98 percent relative humidity. The electrode fiber material is dry charged by passing it through a sulfuric acid bath with lead oxide counter electrodes and charging it to 115 percent of the theoretical capacity. The anode fiber 24 is washed in deionized water until the acid level is 0.05 percent. The anodes are covered with the separators 34 made of a woven sheath of glass fibers (or other material such as polypropylene) and sealed at the ends with epoxy (if the fibers are already chopped into short lengths), numeral 56. The fiber anode material is placed onto a first spool, numeral 58. Alternatively, the electrode fibers may be bonded to a thin flexible tape such as epoxy tape to facilitate handling, in either desired lengths corresponding to the thickness of the battery or in continuous form. The spool approach is preferred for fiber electrode diameters of less than about 0.1 millimeter, and the tape approach is preferred for larger diameters. In yet another approach, the electrode fibers may be embedded in a block of the separator material, and individual layers sliced from the block.

Positive fiber cathodes 28 are prepared in a similar manner, except that the cathode fibers 30 are preferably an aluminum core which is coated with molten lead by drawing the core through a lead bath, numeral 60. The cathode fibers 30 are coated with standard positive battery paste of oxides, chopped carbon fibers, red lead, sulfuric acid, and water, using the applicator 80 except with another diameter of applicator tube 86 as desired. The battery paste is cured as necessary, numeral 64, in this case at 60°-90° C. for 42-72 hours in air of 98 percent relative humidity. The separator material is coated onto the fibers 30, numeral 66. The fiber cathode material, supported on a flexible tape if desired, is placed onto a second spool, numeral 68.

The fibrous electrodes 22 and 28 are arranged into an array of alternating layers such as shown in FIG. 2, numeral 70. In commercial-scale operations, this arranging of the fibrous electrodes is preferably accomplished using a fiber winding technique or a tape layering technique, depending upon the form used in the fiber electrode preparation. The following description is specific to the fiber winding technique. A first layer of one of the fibrous electrodes, the fiber anode, for example, is wound onto a mandrel of large diameter. A second layer of the other fibrous electrode, in this case the fiber cathode, is wound overlying the first layer. As the winding occurs, the layer being wound is massaged slightly to cause each turn to lie in contact with two adjacent turns of the underlying layer. This produces a close-packed structure, with minimal open space between the turns and the underlying layer. After the second layer is wound, a third layer of the fiber anode material is wound overlying the second layer, a fourth layer of the fiber cathode material is wound overlying the third layer, and so on until the required number of layers is produced. (Where the tape approach is used, alternating layers of tape, with the attached electrode fibers, are stacked to produce a similar type of structure.)

The wound layers are fixed in place so that the turns and layers do not shift, numeral 72. The fixing may be accomplished either by heating the assembly, optionally with an applied isostatic pressure, to sinter the separator layers together, or by using as part of the fibrous electrode structure a material that cures by other means, such as, for example, an ultraviolet-curable polymer.

Figure 9A:
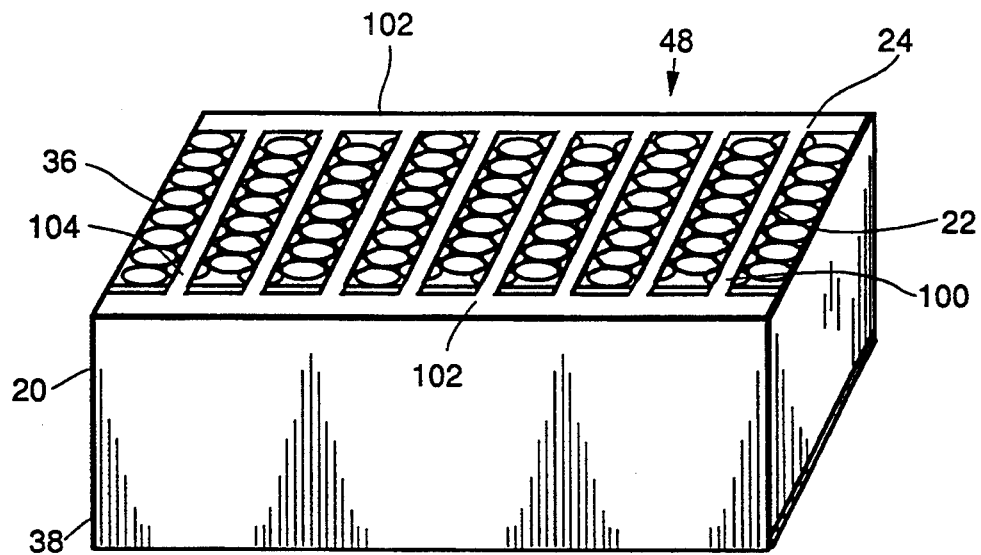
Figure 9B:
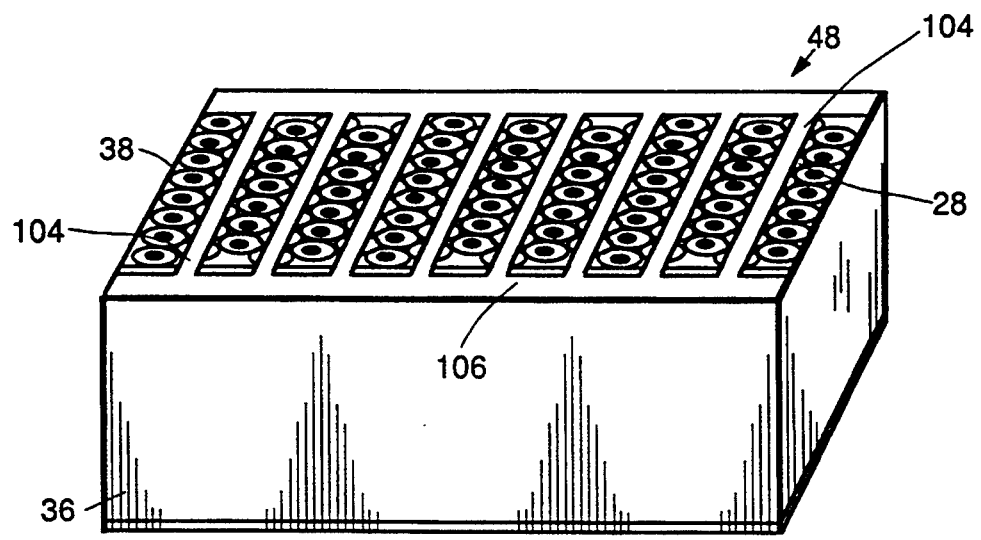
Figure 9C:

The electrical end connectors 48 are applied, numeral 74. FIGS. 9(a)-9(c) depict the preferred approach using microelectronic deposition and patterning techniques. At the first end 36 of the array, a layer of metal is deposited, FIG. 9(a). The layer is patterned and etched so as to form a plurality of parallel conductive stripes 100. Each stripe 100 lies parallel to and in registry with one of the layers of the anode fibers 24. Thus, there are as many stripes 100 as there are layers of fiber anodes. The stripes 100 extend to the lateral margins of the first end 36 and connect to conductive buses 102. The buses extend to external contacts, not shown, by which electrical contact is made to the anode fibers 24. One of the stripes 100 is visible in section in FIG. 7.

The battery 20 is turned end-for-end, to permit access to the second end 38. A second set of stripes 104 and buses 106 is formed by the same approach as discussed previously, deposition of a metal layer, patterning, and etching, except as will be next described.

To identify the cathode fibers 30 to which contact should not be made, a voltage of at least about 2-5 volts is applied to the anode fibers 24 to which contact has previously been made at the first end 36. This voltage causes the ends of the anode fibers 24 to emit electrons, which can be detected by viewing the second end 38 in a scanning electron microscope. Any cathode fibers 30 that are electrically shorted to the anode fibers 24 (due, for example, to a discontinuity in the separator layer) will also emit electrons and can be identified as a defect. Such a defect 108 is indicated in FIG. 9(c). Once the defect 108 is identified, the second stripes 104 are deposited so as not to make contact with the defect 108. Consequently, no external electrical connection is made to the fiber electrode that has experienced a short. The defect 108 therefore does not interfere with the operation of the electrical device by electrically shorting the adjacent layers. The incidence of such shorting defects 108 is relatively small, but, where present, their presence is negated by the described connection approach. Another approach would be to pretest each insulated electrode to be certain of the absence of a short, but the described technique is far more practical where large numbers of small-diameter fiber electrodes are used.

After the electrical connections are made at both ends, the electrical structure is placed into the container 45, if provided, numeral 76. The container is filled with the electrolyte through the fill holes 42, and the fill holes 42 are sealed.

Other variations are possible, as well. For example, the individual fiber electrodes 22 and 28 may be made hexagonal in cross sectional shape so as to achieve even closer packing and filling of the space within the battery, as shown in FIG. 11. The battery itself may be of any desired external shape to conform to available space. For example, FIG. 12 shows a hexagonal battery which can be closely packed with other hexagonal batteries.

A capacitor was prepared using the approach described above. Both the anode and cathode fibers were carbon, and were coated with a dielectric beta-spodamine glass separator. The fiber bundles were hot isostatically pressed to consolidate the dielectric material. The hot isostatic pressing process h ad the desirable effect of causing the dielectric to surround and fully encapsulate the fibers, so that there were virtually no electrical shorts observed when the consolidated bundles were tested for shorting in the manner described above. The electrode structure was, in this case, prepared as a single large block for ease of fabrication, and the block was subsequently cut into thin sheets. The sheets were stacked as alternating layers with electrical connection to the opposite ends of each layer in the manner described. The resulting capacitor was tested and was found to provide 10-50 times the capacitance of a conventional surface-mounted capacitor.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for preparing an electrical device, comprising the steps of:
   furnishing first fibrous electrodes;
   furnishing second fibrous electrodes;
   arranging a group of the first fibrous electrodes into a first layer with the first fibrous electrodes parallel to each other in the first layer;
   arranging a group of the second fibrous electrodes into a second layer with the second fibrous electrodes parallel to each other in the second layer, the first layer and the second layer forming an array of electrodes, the second layer being immediately adjacent to and in facing relationship with the first layer with the fibrous electrodes of the two layers parallel to each other;
   forming first electrical connections to at least some of the first fibrous electrodes at a first end of the array; and
   forming second electrical connections to at least some of the second fibrous electrodes at a second end of the array.

2. The method of claim 1, including the additional step, after the steps of arranging and before the steps of forming, of
   adding to the array additional alternating layers of the first fibrous electrodes and of the second fibrous electrodes, each of the layers having the fibrous electrodes parallel to the fibrous electrodes of the first layer and the second layer, the additional alternating layers being adjacent to each other and in facing relationship to each other.

3. The method of claim 2, wherein the step of forming second electrical connections includes the step of:
   identifying any shorted fibers which have electrical shorts between the second fibrous electrodes therein and the first electrodes of the adjacent layers; and
   omitting the formation of second electrical connections to the shorted fibers.

4. The method of claim 3, wherein the step of identifying includes the step of
   applying an electrical potential to the first fibrous electrodes and observing activity responsive to an applied electrical potential in the second fibrous electrodes.

5. The method of claim 1, wherein the step of furnishing first fibrous electrodes includes the steps of
   furnishing a first fibrous electrical conductor, and
   applying an first overlying layer over the first fibrous electrical conductor.

6. The method of claim 5, wherein the first overlying layer applied in the step of applying includes a first separator.

7. The method of claim 6, wherein the first overlying layer includes a first active material between the first fibrous electrical conductor and the first separator.

8. The method of claim 1, wherein the step of furnishing second fibrous electrodes includes the steps of
   furnishing a second fibrous electrical conductor, and
   applying a second overlying layer over the second fibrous electrical conductor.

9. The method of claim 8, wherein the first overlying layer applied in the step of applying includes a first separator.

10. The method of claim 9, wherein the first overlying layer includes a first active material between the first fibrous electrical conductor and the first separator.

11. The method of claim 1, wherein the steps of forming each include the steps of
    depositing an electrical bus on the end of the array,
    depositing alternating rows of connector lines between the electrical bus and the fibrous electrodes of the respective layers.

12. An electrical device prepared by the method of claim 1.

13. A method for preparing an electrical device, comprising the steps of:
    furnishing first fibrous electrodes;
    furnishing second fibrous electrodes;
    arranging the first fibrous electrodes into a plurality of first layers with the first fibrous electrodes parallel to each other in each of the first layers;
    arranging the second fibrous electrodes into a plurality of second layers with the second fibrous electrodes parallel to each other in the second layers, the first layers and the second layers being arranged in alternating fashion with each other in a immediate adjacent and facing relationship to form an array of electrodes having the fibrous electrodes of the two layers parallel to each other;
    forming first electrical connections to at least some of the first fibrous electrodes at a first end of the array; and
    forming second electrical connections to at least some of the second fibrous electrodes at a second end of the array.

14. The method of claim 13, wherein the step of forming second electrical connection includes the step of:
    identifying any shorted fibers which have electrical shorts between the second fibrous electrodes therein and the first electrodes of the adjacent layers; and
    omitting the formation of second electrical connections to the shorted fibers.

15. The method of claim 13, wherein the step of arranging includes the step of
    placing the first fibrous electrodes and the second fibrous electrodes into a substantially close packed arrangement, when the array is viewed from an end of the array.

16. The method of claim 13, wherein the step of arranging includes the step of
    fixing the fibrous electrodes of the layers in place.

17. The method of claim 13, including the additional step of
    placing the array into a housing.

18. An electrical device prepared by the method of claim 13.

19. An electrical device, comprising:
    a plurality of first layers of first fibrous electrodes, the first fibrous electrodes lying parallel to each other in the first layers;
    a plurality of second layers of second fibrous electrodes, the second fibrous electrodes lying parallel to each other in the second layers, the first layers and the second layers being arranged in alternating fashion with each other in a immediate adjacent and facing relationship to form an array of electrodes having the fibrous electrodes of the two layers parallel to each other;

a first electrical connection to at least some of the first fibrous electrodes at a first end of the array; and a second electrical connection to at least some of the second fibrous electrodes at a second end of the array.

20. The electrical device of claim 19, wherein the second electrical connections consist essentially of means for establishing electrical connections only to those second fibrous electrodes that are not electrically shorted to a first fibrous electrode.

* * * * *